(12) United States Patent
Bae et al.

(10) Patent No.: US 10,374,462 B2
(45) Date of Patent: Aug. 6, 2019

(54) ENERGY TRANSMISSION APPARATUS AND METHOD

(71) Applicant: LG INNOTEK CO., LTD., Seoul (KR)

(72) Inventors: Su Ho Bae, Seoul (KR); Ki Min Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 4 days.

(21) Appl. No.: 15/824,683

(22) Filed: Nov. 28, 2017

(65) Prior Publication Data

US 2018/0083492 A1 Mar. 22, 2018

Related U.S. Application Data

(63) Continuation of application No. 13/876,969, filed as application No. PCT/KR2011/007216 on Sep. 30, 2011, now Pat. No. 9,866,065.

(30) Foreign Application Priority Data

Sep. 30, 2010 (KR) .................. 10-2010-0095456
Dec. 20, 2010 (KR) .................. 10-2010-0131065

(51) Int. Cl.
*H02J 50/12* (2016.01)
*H02J 7/02* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01); *H02J 50/40* (2016.02); *H04B 5/0037* (2013.01)

(58) Field of Classification Search
CPC ..................................................... H02J 50/12
(Continued)

(56) References Cited

U.S. PATENT DOCUMENTS 8,106,539 B2 1/2012 Schatz et al.
8,248,027 B2 * 8/2012 Sakoda .................. H02J 5/005
320/108
(Continued)

FOREIGN PATENT DOCUMENTS

JP 2009-524398 A 6/2009
JP 2010-136464 A 6/2010
(Continued)

OTHER PUBLICATIONS

International Search Report in International Application No. PCT/KR2011/007216, filed Sep. 30, 2011.

*Primary Examiner* — Rexford N Barnie
*Assistant Examiner* — Joseph N Inge
(74) *Attorney, Agent, or Firm* — Saliwanchik, Lloyd & Eisenchenk

(57) ABSTRACT

An apparatus and method for wirelessly transmitting electromagnetic energy are provided. The apparatus includes a power source, a transmission unit, and a measurement unit. The power source supplies a power according to a certain frequency. The transmission unit receives the power to wirelessly transmit the received power through self resonance. The measurement unit measures a phase difference between a voltage and current of the transmission unit. The certain frequency is controlled according to the phase difference. Accordingly, the apparatus and method control only the frequency of the power supply when a resonance frequency is changed by the change of an ambient environment, thus enhancing energy transmission efficiency.

5 Claims, 2 Drawing Sheets

(51) Int. Cl.
*H02J 50/40* (2016.01)
*H02J 5/00* (2016.01)
*H04B 5/00* (2006.01)
*H02J 17/00* (2006.01)

(58) Field of Classification Search
USPC ........................................................ 307/104
See application file for complete search history.

(56) References Cited

U.S. PATENT DOCUMENTS

| | | |
|---|---|---|
| 8,432,125 B2 | 4/2013 | Takada et al. |
| 2009/0284369 A1 | 11/2009 | Toncich et al. |
| 2010/0117456 A1 | 5/2010 | Karalis et al. |
| 2010/0176659 A1 | 7/2010 | Aoyama et al. |
| 2010/0289449 A1 | 11/2010 | Elo |
| 2011/0049997 A1 | 3/2011 | Urano |
| 2011/0050166 A1 | 3/2011 | Cook et al. |
| 2011/0195666 A1 | 8/2011 | Forsell |
| 2012/0235502 A1* | 9/2012 | Kesler ................... H03H 7/40 307/104 |
| 2013/0154386 A1 | 6/2013 | Bae |

FOREIGN PATENT DOCUMENTS

| | | |
|---|---|---|
| KR | 10-2010-0082030 A | 7/2010 |
| WO | WO-2009/116025 A2 | 9/2009 |

* cited by examiner

ENERGY TRANSMISSION APPARATUS AND METHOD

CROSS-REFERENCE TO RELATED APPLICATIONS

This application is a continuation of U.S. application Ser. No. 13/876,969, filed Mar. 29, 2013; which is the U.S. National Stage Application of International Patent Application No. PCT/KR2011/007216, filed Sep. 30, 2011; which claims the benefit under 35 U.S.C. § 119 of Korean Patent Application Nos. 10-2010-0095456, filed on Sep. 30, 2010, and 10-2010-0131065, filed on Dec. 20, 2010, all of which are herein incorporated by reference in their entirety.

TECHNICAL FIELD

The present disclosure relates to an energy transmission apparatus and method, and more particularly, to an energy transmission apparatus and method, which recontrol a resonance frequency with a phase difference, measured in a transmitting end, even when the resonance frequency is changed, and thus can increase energy transmission efficiency.

BACKGROUND ART

Industry equipment and most home appliances (which are used in daily life) such as portable devices and office equipment are using electric energy that is supplied from a power plant by cable. To date, a power is being supplied by cable without great inconvenience, but the recent advance and wide use of various portable devices are showing that power supply by cable is not suitable as a power supply source for portable devices. For example, when a portable device receives a power from a battery having a low charge capacity, the battery has a fast recharge period due to the low charge capacity in spite of the enhancement in functions of portable devices. To supplement this limitation, the charge capacities of batteries have increased, but portable devices increase in weight and decrease in portability. Furthermore, in portable terminals which are necessities in daily life, when a battery is completely discharged, it is difficult to charge the battery anywhere. Also, as the use of laptop computers increases, the supply of a power is becoming an increasingly important issue.

As a wireless power transfer (or transmission) technology that wirelessly transfers electric energy from a power source to a desired device, electric motors or transformers using an electromagnetic induction scheme were used from the 1800s. Since then, a method was tried for transmitting electric energy by irradiating electromagnetic wave such radio wave or laser. Electric toothbrushes and some wireless razors are charged by the electromagnetic induction scheme. The kinds of wireless energy transmission schemes are as follows.

First, there is an electromagnetic induction scheme based on magnetic induction. The magnetic induction scheme, which induces a current from a coil to another coil through a magnetic field, has limitations in that a load power and a relative position and distance between the coils are required to be accurate. However, some companies started relaunching new wireless charge devices that charge portable terminals, Personal Digital Assistants (PDAs), MP3 players, and notebook computers by using the electromagnetic induction scheme.

Second, there is a non-radiative wireless transmission technology using a near-field effect. The non-radiative wireless transmission technology is based on an evanescent wave coupling scheme where electromagnetic wave moves from a medium from another medium through a near electromagnetic field when the mediums resonate at the same frequency. A charge station connected to a power source forms the electromagnetic field, and when approaching a portable device, including a receiver that has been designed at the same resonance frequency of MHz band, to inside the electromagnetic field, a kind of energy tunnel is formed between two mediums, thereby charging the portable device within a distance of several m from the charge station. Particularly, such energy is non-radiative and based on a magnetic field, and thus, only when there is a device having a resonance frequency, the energy is transferred to the device, but an unused portion of the energy is spread into the air and reabsorbed into an electromagnetic field. Therefore, unlike electromagnetic wave, the energy does not affect ambient machines and/or human bodies.

Third, there is a long-distance transmission technology using a short-wavelength wireless frequency within an electromagnetic wave range. The long-distance transmission technology uses an electromagnetic radiation scheme using microwave of 5.8 GHz, but is fatal to human bodies.

A wireless power technology according to the present invention is based on the non-radiative wireless transmission technology, and a wireless power transmission apparatus using a magnetic field resonator has a configuration of FIG. 1 generally. When a transmission coil 21 generates a magnetic field with a power generated by an Alternating Current (AC) signal generator 10 and energy is transferred to a transmission resonance coil 22, the transmission resonance coil 22 resonates and amplifies the magnetic field. The amplified magnetic field enables energy to be transmitted much farther than power transmission based on a typical magnetic field induction scheme. Likewise, a reception resonance coil 31 resonates and amplifies a transferred magnetic field, thereby allowing energy to be received efficiently. As a result, energy can be efficiently transmitted to a long distance.

In a magnetic field resonance scheme, however, the resonance frequencies of the transmission resonance coil 22 and reception resonance coil 31 are changed when an ambient environment is changed or an object 50 is located on an energy transfer path. In this case, an energy amplification rate is reduced, thereby affecting energy transmission efficiency in a certain distance.

DISCLOSURE OF INVENTION

Technical Problem

Embodiments provide an energy transmission apparatus and method, which sense the change of a resonance frequency and control the frequency of an C signal generator in order for energy transmission efficiency to be maintained.

Embodiments also provide a method which senses the change of a resonance frequency in a resonance coil.

Solution to Problem

In one embodiment, a wireless power transmission apparatus includes: a power source supplying a power according to a certain frequency; a transmission unit receiving the power to wirelessly transmit the received power through self resonance; and a measurement unit measuring a phase difference between a voltage and current of the transmission unit, wherein the certain frequency is controlled according to the phase difference.

In another embodiment, a method of transmitting electromagnetic energy includes: supplying a power according to a certain frequency; receiving, by a transmission unit, the power to generate magnetic field energy and transmit the magnetic field energy to an energy consumption apparatus; and measuring a phase difference between a voltage and current of the transmission unit, wherein the certain frequency is controlled according to the phase difference.

The details of one or more embodiments are set forth in the accompanying drawings and the description below. Other features will be apparent from the description and drawings, and from the claims.

Advantageous Effects of Invention

According to embodiments, the effect that is given to a resonance frequency according to the change of an ambient environment can be compensated for, and thus, energy can be stably transmitted.

MODE FOR THE INVENTION

Reference will now be made in detail to the embodiments of the present disclosure, examples of which are illustrated in the accompanying drawings.

In a below description, "module" and "unit" that are suffixes of respective elements are used for easy description of the specification, and the "module" and "unit" may be used together.

Furthermore, embodiments will be described in detail with reference to the accompanying drawings and contents that are described in the accompanying drawings, but the present invention is not limited to embodiments.

In the specification, for the terms used in the present disclosure, general terms widely currently used have been selected as possible as they can. However, this may be changed according to the intention or custom of a technician working in the art or the advent of new technology. In a specific case, moreover, terms arbitrarily selected by an applicant may be used. In this case, since the meaning thereof is described in detail in the detailed description of the specification, the present disclosure should be understood in an aspect of meaning of such terms, not the simple names of such terms.

Figure 1:
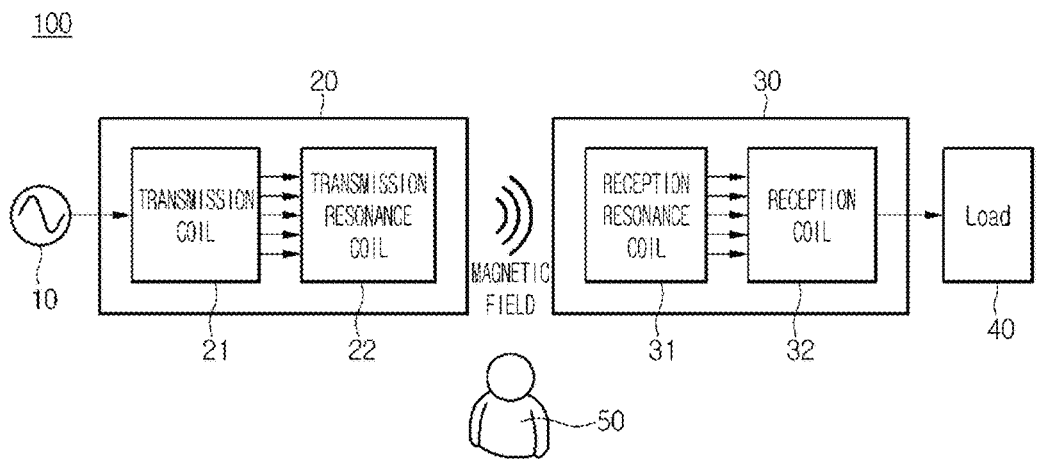
FIG. 1 is a block diagram schematically illustrating a configuration for a related art wireless energy transmission method.

FIG. 1 is a block diagram illustrating a configuration of a wireless energy transmission apparatus according to an embodiment.

Referring to FIG. 1, a wireless energy transmission apparatus 100 according to an embodiment may include a power source 10. The power source 10 may generate an AC voltage with a certain frequency ($\omega$). The certain frequency ($\omega$) may be a default frequency ($\omega_o$). The default frequency ($\omega_o$) may be a resonance frequency when there is not any object such as an interference object 50. Alternatively, the default frequency ($\omega_o$) may be an ideal resonance frequency when a target energy consumption apparatus 40 is included as in FIG. 1. The certain frequency ($\omega$) may be changed at intervals or by an external factor, or controlled arbitrarily.

The wireless energy transmission apparatus 100 according to an embodiment may include a transmission unit 20. The transmission unit 20 may include a transmission coil 21 and a transmission resonance coil 22. When a magnetic field is generated by the transmission unit 20, energy is transferred to the transmission resonance coil 22. The magnetic field may be amplified by allowing resonance to occur in the transmission resonance coil 22. The amplified magnetic field may be transferred to a reception unit 30 through a space.

The wireless energy transmission apparatus 100 according to an embodiment may include the reception unit 30. The reception unit 30 may amplify the amplified magnetic field that is received from a reception resonance coil 31, in the same scheme as that of the transmission unit 20. The reception unit 30 may transfer the amplified magnetic field to the energy consumption apparatus 40 via the reception coil 32.

When the power source 10 generates a power having the default frequency ($\omega_o$) while the magnetic field is not being affected by the interference object 50, resonance may occur by the power having the default frequency ($\omega_o$), and then the power may be amplified and transferred to the energy consumption apparatus 40. However, when an ambient environment is changed or a change arises on an energy transfer path in the transmission unit 20 or reception unit 30, the resonance frequency may become different from the default frequency ($\omega_o$). At this point, the frequency of the power source 10 may be controlled by sensing the change of the resonance frequency.

The wireless energy transmission apparatus 100 according to an embodiment may further include a measurement unit (not shown) that senses the change of the resonance frequency.

Figure 2:
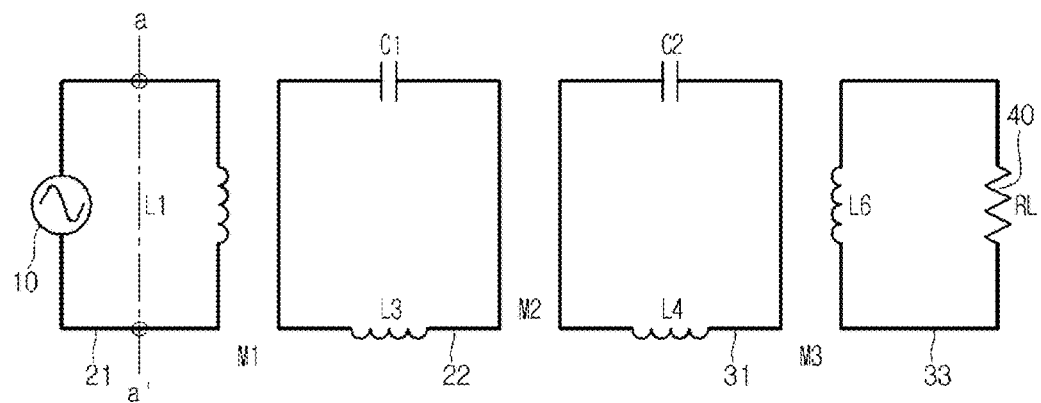
FIG. 2 is a circuit diagram of a wireless energy transmission apparatus according to an embodiment.
Figure 3:
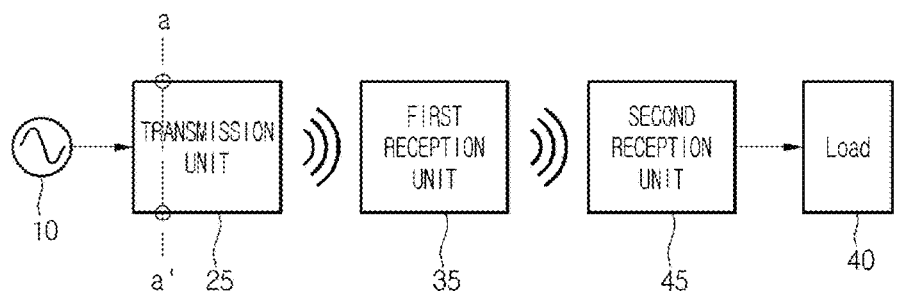
FIG. 3 is a block diagram illustrating a configuration of a wireless energy transmission apparatus according to another embodiment.

FIG. 2 is a circuit diagram of a wireless energy transmission apparatus according to an embodiment. Referring to FIG. 3, the transmission coil 21 may include a coil having a self inductance L1. The transmission coil 21 may receive the power generated by the power source 10 to generate a magnetic field, and transfer the magnetic field to the transmission resonance coil 22 having a mutual inductance M1 that is generated by coupling between the transmission coil 21 and transmission resonance coil 22. The magnetic field amplified by the transmission resonance coil 22 may be transferred to a space. Subsequently, the magnetic field may be transferred to the reception unit 30 having a mutual inductance M2 that is generated by coupling between the transmission resonance coil 22 and the reception resonance coil 31, and then transferred to the energy consumption apparatus 40 having a resistance RL.

Moreover, the wireless energy transmission apparatus 100 according to an embodiment may measure a phase difference between a voltage and current of the transmission unit 20. A measurement unit (not shown) for measuring a phase difference between an input voltage and current may be disposed between terminals a and a' of the transmission coil 21, and measure the phase difference.

The measurement unit may measure an input voltage and an external voltage, for measuring the phase difference.

FIG. 3 is a block diagram illustrating a configuration of a wireless energy transmission apparatus according to another embodiment. In FIGS. 1 and 2, the energy transmission apparatus including one transmission unit and one reception unit is illustrated. Referring to FIG. 3, two or more reception units are sequentially disposed, and thus, energy may be transferred. Specifically, magnetic field energy that is generated and amplified by a transmission unit 25 may be transferred to an energy consumption apparatus 40 via first and second reception units 35 and 45. Even in this case, a measurement unit (not shown) may measure a phase difference between a voltage and a current, in an input terminal of the transmission unit 25. That is, by measuring a phase difference in the input terminal of the transmission unit 25, the energy transmission apparatus can simply measure a changed resonance frequency irrespective of the number and shapes of reception units and the configuration or number of energy consumption apparatuses.

Figure 4:
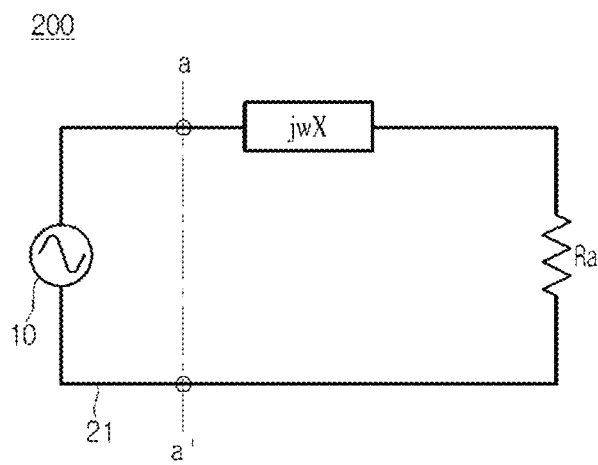
FIG. 4 is a circuit diagram illustrating a simplified configuration of a wireless energy transmission apparatus according to an embodiment.

FIG. 4 is a circuit diagram illustrating a simplified configuration of a wireless energy transmission apparatus according to an embodiment. FIG. 4 is an equivalent circuit of the circuit of FIG. 2. That is, in an entire system, the power source, transmission unit, reception unit, and energy consumption apparatus of FIGS. 1 and 2 may be equalized as the parallel circuit of FIG. 4. In the equivalent circuit of FIG. 4, terminals a and a' correspond to an input terminal of the transmission coil 21. The equivalent circuit has a resistance Ra that is a real number component of an entire input impedance of a system that is measured in the input terminal of the transmission coil 21, and an imaginary number component jwX of the entire input impedance.

When resonance occurs in an entire system illustrated in FIG. 4, only a real number component in an entire impedance value of the system is left, and thus, a phase difference (which is measured in the terminals a and a') between a voltage and a current is zero. However, as illustrated in FIG. 1, the entire impedance of the system may be changed by an ambient environment 50, in which case the entire impedance value of the equivalent circuit in FIG. 4 may be changed. That is, the phase difference (which is measured in the input terminal of the transmission coil 21) between the voltage and current has a real number component, and moreover, may have an imaginary number component. That is, the entire impedance may include a resistor and a reactance.

The entire impedance with respect to the terminals a and a' is expressed Equation (1) below.

$$Z_{in} = jwL_1 + \left(\frac{M_1 M_3}{M_2}\right)^2 \frac{R - jwL_6}{R^2 + w^2 L_6^2} \quad \text{Equation 1}$$

The imaginary number component of the entire impedance of the system is expressed as Equation (2) below.

$$Z_{in-imaginary} = jw\left(L_1 - \left(\frac{M_1 M_3}{M_2}\right)^2 \frac{L_6}{R^2 + w^2 L_6^2}\right) = jwX \quad \text{Equation 2}$$

A phase difference (θ) between a voltage and a current that are supplied from the power source 10 is expressed as Equation (3) below.

$$\tan(\theta) = \frac{Z_{in-imaginary}}{Z_{in-real}} \quad \text{Equation 3}$$

A relationship (which allows an imaginary number component to become zero.) between a frequency and a mutual inductance $M_2$ is defined as Equation (4) below.

$$w = \sqrt{\frac{1}{L_1 L_6}\left(\frac{M_1 M_3}{M_2}\right)^2 - \frac{R^2}{L_6^2}} \quad \text{Equation 4}$$

As illustrated in FIG. 4, $L_1$, $L_6$, $M_1$, $M_3$, and R values are respective fixed values and may be known in advance, and thus, when the $M_2$ value is a priori value, the value of the resonance frequency (ω) may be obtained.

That is, by recontrolling the frequency of the power source 10 as a frequency that has been obtained with Equation (4), an entire system can again resonate.

In FIG. 4, the equivalent circuit of an entire system is illustrated as a parallel circuit, but the embodiment is not limited thereto. As an example, the entire system may be equalized as a serial circuit. The power source 10 may recontrol a frequency when sensing the change of a resonance frequency that arises at predetermined intervals or by the change of an ambient environment, or recontrol the frequency according to a user input.

Figure 5:
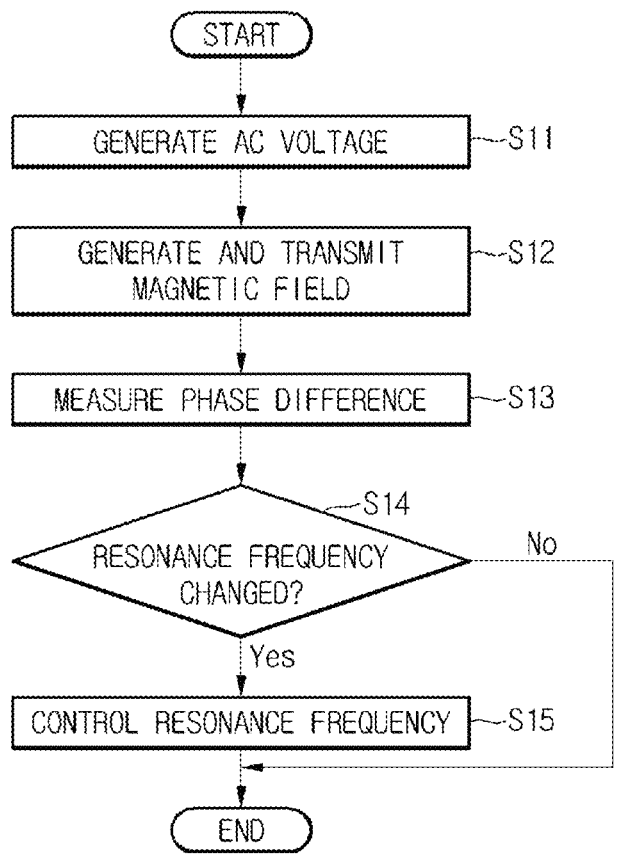
FIG. 5 is a flowchart illustrating a wireless energy transmission method according to an embodiment.

FIG. 5 is a flowchart illustrating a wireless energy transmission method according to an embodiment.

In operation S11, the power source generates an AC voltage having a certain frequency ($ω_o$).

In operation S12, the energy transmission apparatus according to an embodiment generates a magnetic field with the AC voltage and transfers the magnetic field to the energy consumption apparatus. In this case, the magnetic field may be transferred to the energy consumption apparatus via the transmission unit and reception unit.

In operation S13, a phase difference between a voltage and a current is measured in the transmission unit. The phase difference may be measured in the input terminal of the transmission unit.

In operation S14, the energy transmission apparatus determines whether a resonance frequency is changed, based on the measured phase difference. The energy transmission apparatus determines whether the measured phase difference is greater than zero, namely, whether the entire impedance of the system is changed and thus includes a reactance value.

As another example, the energy transmission apparatus may determine whether the measured phase difference is greater than a predetermined phase difference threshold value, thereby determining whether the resonance frequency is changed. When the predetermined phase difference threshold value, for example, is within a range from −0.1 radian to +0.1 radian, the energy consumption apparatus may determine the resonance frequency as not being changed. When the resonance frequency is not changed, the power source maintains the frequency as the certain frequency ($ω_o$) without recontrolling or changing the frequency.

In operation S15, when the resonance frequency is determined as being changed, the energy transmission apparatus may recontrol the resonance frequency (ω) with the certain frequency ($ω_o$) on the basis of the measured phase difference.

The energy transmission apparatus and method according to embodiments are not limited to the above-described configuration and method, but all or a portion of the embodiments may be selectively combined and configured so as to enable various modifications.

The energy transmission method according to embodiments may be realized as codes readable with a processor, in a record medium readable with a processor that is included in televisions, computers, potable terminals, smart phones, tablet computers, etc. The energy transmission method according to embodiments may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitting apparatus comprising:
    a power supply configured to generate AC power having a resonance frequency that is a first frequency when there is no object;
    a transmitting coil configured to transmit wireless power to a wireless power receiving apparatus, based on the AC power; and
    a measuring unit configured to sense an input impedance of the transmitting coil,
    wherein the input impedance includes a real component and an imaginary component,
    wherein when there is no object present to affect a magnetic field of the transmitting coil, resonance is generated by the AC power to have the resonance frequency such that the input impedance includes only the real component,
    wherein when there is an object located on an energy transfer path such that the magnetic field of the transmitting coil is affected the object, the resonance frequency is changed to be a second frequency and to increase the imaginary component of the input impedance,
    wherein the wireless power transmitting apparatus is configured:
    to determine if the increased imaginary component of the input impedance is within a predetermined range, and
    when the increased imaginary component of the input impedance is out of the predetermined range, to control the power supply to change the second frequency to be the resonance frequency such that the imaginary component of the input impedance is adjusted to be within the predetermined range.

2. The wireless power transmitting apparatus of claim 1, wherein the wireless power transmitting apparatus controls a resonance condition with the wireless power receiving apparatus.

3. The wireless power transmitting apparatus of claim 1, wherein the wireless power transmitting apparatus transmits the wireless power to a plurality of wireless power receiving devices of the wireless power receiving apparatus.

4. A wireless power transmitting method comprising:
    generating, by a power supply, AC power having a resonance frequency that is a first frequency when there is no object;
    transmitting wireless power to a wireless power receiving apparatus through a transmitting coil, based on the AC power;
    sensing an input impedance of the transmitting coil, the input impedance including a real component and an imaginary component;
    generating resonance by the AC power to have the resonance frequency such that the input impedance includes only the real component, when there is no object present to affect a magnetic field of the transmitting coil;
    changing the resonance frequency to be a second frequency and to increase the imaginary component of the input impedance, when an object is located on an energy transfer path such that the magnetic field of the transmitting coil is affected by the object;
    determining if the increased imaginary component of the input impedance is within a predetermined range; and
    when the increased imaginary component of the input impedance is out of the predetermined range, controlling the power supply to change the second frequency to be the resonance frequency such that the imaginary component of the input impedance is adjusted to be within the predetermined range.

5. The method of claim 4, wherein the wireless power is transmitted to a plurality of wireless power receiving devices of the wireless power receiving apparatus.

* * * * *